United States Patent Office 2,944,911
Patented July 12, 1960

2,944,911

ACETYLENE CONTAINER FILLER AND METHODS

Nathan William Muller, Clarendon Hills, and Charles Stephen Long, Chicago, Ill., assignors, by mesne assignments, to Acetylene Cylinder Corp., San Francisco, Calif., a corporation of California No Drawing. Filed Feb. 9, 1956, Ser. No. 564,360

4 Claims. (Cl. 106—120)

This invention relates to containers for holding dissolved acetylene, which containers are provided with a porous absorbent material or filler. More particularly, the invention is directed to an improved highly porous filler for acetylene containers together with a method of manufacturing such a filler and a method of filling acetylene containers with such improved filler material.

It is well known that acetylene gas, even in very small amounts, may become violently unstable at pressures in excess of 15 p.s.i. and almost with certainty above 50 p.s.i. This condition is substantially overcome by dissolving the acetylene in acetone which will dissolve as much as 6 times its own weight of acetylene. Pressures up to 300 p.s.i. or more of dissolved gas may be obtained in this manner if the acetone container is filled with a highly porous material, the individual pores of which are minute. The material must be such however that it will not settle, shrink or disintegrate to leave voids within which acetylene gas under pressure may collect and become unstable. In other words, in addition to high porosity, it must have relatively high compressive strength and dimensional stability.

Heretofore a large number of materials have been proposed for use as fillers for acetylene containers. These among others have included balsa wood, Kapoc, kieselguhr, charcoal and asbestos. Such fillers, although sound in nature, were limited to a porosity in the neighborhood of 75%. More recently a substantially monolithic filler for acetylene cylinders has been proposed, having a porosity of between 80% and 86%. Such a filler comprises the calcium silicate product obtainable by reaction between calcium hydrate and a material consisting essentially of silica, such as sand. This form of filler, although good in such qualities as strength and porosity, exhibits substantial shrinkage which creates voids between it and its container, and hence it lacks the requisite dimensional stability required for complete satisfaction of the intended purpose.

In the present invention, by suitable combination and proportion of ingredients, together with a predetermined method of compounding these, a highly desirable, dimensionally stable, high porosity, low volume and high compressive strength filler has been obtained, the overall porosity of which is in the neighborhood of 90% to 92%. Moreover, the invention further comprises a method for obtaining the complete filling of acetylene containers with this material.

It is accordingly the principal object of this invention to provide a filler material of high porosity, low volume and substantial compressive strength capable of completely filling acetylene containers.

A further object of this invention, in keeping with the foregoing object, is to provide a filler material for acetylene containers of the type comprising hydrated calcium meta-silicate, reinforced with charcoal and asbestos.

Another object of this invention is to provide a method for compounding the acetylene container filler material set forth in the foregoing objects.

Still another object of this invention is to provide a method for completely filling acetylene containers with the materials referred to in the foregoing objects, in a rapid and efficient manner.

These and additional objects and advantages of the invention will become more apparent as the following description proceeds.

The preparation and composition of the improved acetylene container filler according to this invention comprises an initial pre-treatment of charcoal and lime in the following manner. Porous charcoal, preferably screened to pass through a ½ inch mesh, is soaked under water for at least 12 hours. In this period of time the small sized pieces of charcoal absorb water to capacity.

Pulverized lime (any high calcium commercially available pulverized lime is acceptable) is hydrated with water to obtain a slurry comprising about 20% by weight of the calcium oxide.

Sufficient additional water to make the entire water-to-solids ratio equal to approximately 3.8 is then placed in a mixing vessel, into which is charged fibrous asbestos. The fibrous asbestos and water are mixed until all visible air bubbles have disappeared.

The pre-soaked charcoal is then added to the asbestos-water slurry and dispersed by agitation.

At this point finely divided silicon dioxide, preferably in the form of diatomacious earth, is then added to the asbestos-charcoal-water slurry, at such a rate as to minimize agglomeration or the formation of lumps. Thereafter mixing should continue for a period of around 15 to 30 minutes. The silicon dioxide is added in an amount equal to twice the weight of the lime originally hydrated.

The hydrated lime mixture is then charged into this slurry and mixing is continued for a period of approximately 15 minutes or until the entire mass is homogeneous. At this point, the filler slurry may be removed from the mixer and is ready for charging into the acetylene containers.

The following formula has been found to be preferable to obtain a porosity in the neighborhood of 92%:

Water to solids ratio by weight_____ 3.8
Silicon dioxide to lime weight ratio_____ 2.0
Asbestos in percent of solids by weight_____ 25
Charcoal in percent of solids by weight_____ 20

It has been found that variations may be made in this preferred formula, but these should not exceed about 20% as to each ingredient.

Fillers having a porosity of between 88% and 90% have been obtained by the following formula:

Water to solids ratio_____ 3.5
Silicon dioxide to lime weight ratio_____ 2.0
Asbestos in percent of solids by weight_____ 20
Charcoal in percent of solids by weight_____ 15

Other formulas which have been found to be acceptable but not to the degree of the preferred formula, principally because of lower porosities and less crushing strength are:

Silicon dioxide to lime weight ratio_____ 1.61 to 2.47
Asbestos in percent solids by weight_____ 20 to 30
Charcoal in percent solids by weight_____ 15 to 30
Water to solids ratio by weight_____ 3 to 4.5

It should be noted however that any substantial increases in the water to solids ratio by weight and in the silicon dioxide to lime ratio greater than those indicated result in shrinkages in excess of those that can be compensated for by the charcoal, and this restricts their value as acetylene container fillers.

The completed filler slurry as described is placed in a hopper from which it is introduced into empty commercial acetylene container shells. It is preferable that one of the top fuse plugs of each of the shells be removed and a vacuum line attached. The filling is preferably carried out with a vacuum maintained at about 25 inches of mercury. When the containers are about half filled, the filling should be stopped and the cylinder vibrated or jarred for about 30 to 60 seconds. The filling is then continued until no additional slurry will flow into the containers. The containers are then again vibrated for 30 to 60 seconds, after which they are disconnected from the filling apparatus, all holes plugged, and permitted to settle for a period from 12 to 18 hours. After the filled containers have settled, overnight for example, they are again attached to the vibrating apparatus and jarred for another period of 30 to 60 seconds. Filler material of the same batch, for example from which the containers were filled the previous day, is then introduced to fill any space remaining in the shell due to settling or tamping of the filler. The top plug is then replaced and the cylinder is again vibrated for about 30 to 60 seconds. It is reopened and additional filler slurry is again introduced if necessary. This vibrating and filling is repeated until no settling is produced on additional vibration. It has been found generally that about three of such cycles are usually necessary to fill the containers completely. The containers are then removed from the vibrating apparatus and are in condition to be indurated.

In order for the proper chemical reaction to take place within the filler slurry in a reasonable length of time, heat is applied to the container while the loss of water is prevented. It has been found that this induration should be performed promptly after the final filling cycle. Since water expands in this heating process, it is necessary to provide the containers individually with hydraulic expansion heads.

A suitable oven in which the filled containers are placed is brought to a temperature in the range of from 350 to 375 degrees Fahrenheit and is maintained within that range during the entire treatment. Induration should continue for a period of approximately 15 to 16 hours after the oven has reached 350 degrees F.

After the induration period has been completed, the filler is dried under vacuum.

After the containers have cooled, each container is then inspected to determine porosity and density, after which it is charged with acetone in accordance with Interstate Commerce Commission specifications, and then filled with acetylene.

It will be apparent to those skilled in the art that certain modifications in the formulation of this filler material, as well as in the process of compounding and preparing it, and the process of preparing and filling the containers with the filler material after it has been compounded, may be made without departing from the spirit of this invention, and such modifications are intended to be included within the scope of the invention as defined by the appended claims.

We claim:

1. Method of compounding a dimensionally stable acetylene container filler comprising the steps of forming separate slurries of lime and fibrous asbestos with water, soaking charcoal under water until it is substantially saturated, removing the soaked charcoal from the water and mixing it with the asbestos-water slurry, admixing finely divided silica with the asbestos-water-charcoal slurry, charging the lime-water slurry into this mixture, and mixing until the whole is homogeneous, in which the ingredients are in accordance with the following formula:

Silica to lime proportion by weight _____ 1.61 to 2.47
Water to solids proportion by weight ____ 3 to 4.5
Asbestos in percent of solids by weight ___ 20 to 30
Charcoal in percent of solids by weight ____ 15 to 30

2. Method of compounding a dimensionally stable acetylene container filler comprising the steps of forming separate slurries of lime and fibrous asbestos with water, soaking charcoal under water until it is substantially saturated, removing the soaked charcoal from the water and mixing it with the asbestos-water slurry, admixing finely divided silica with the asbestos-water-charcoal slurry, charging the lime-water slurry into this mixture, and mixing until the whole is homogeneous, in which the ingredients are in accordance with the following formula:

Silica to lime proportion by weight _____ 2.0
Asbestos in percent of solids by weight _____ 25
Charcoal in percent of solids by weight _____ 20
Water to solids proportion by weight _____ 3.8

3. An acetylene container filler composition consisting essentially of charcoal and fibrous asbestos dispersed and set in a silica-lime products, according to the following formula:

Silica to lime proportion by weight _____ 1.61 to 2.47
Water to solids proportion by weight _____ 3 to 4.5
Asbestos in percent of solids by weight ____ 20 to 30
Charcoal in percent of solids by weight ___ 15 to 30

4. An acetylene container filler composition consisting essentially of charcoal and fibrous asbestos dispersed and set in a silica-lime product, according to the following formula:

Silica to lime proportion by weight _____ 2.0
Asbestos in percent of solids by weight _____ 25
Charcoal in percent of solids by weight _____ 20
Water to solids proportion by weight _____ 3.8

References Cited in the file of this patent

UNITED STATES PATENTS

| | | |
|---|---|---|
| 835,831 | Noble | Nov. 13, 1906 |
| 1,204,086 | Sutcliffe | Nov. 7, 1916 |
| 2,215,891 | Thompson | Sept. 24, 1940 |
| 2,342,735 | Hellman | Feb. 29, 1944 |
| 2,422,251 | O'Brian | June 17, 1947 |
| 2,504,579 | Perl | Apr. 18, 1950 |
| 2,716,070 | Seipt | Aug. 23, 1955 |
| 2,766,131 | Seipt | Oct. 9, 1956 |